(12) United States Patent
Howard

(10) Patent No.: US 12,429,881 B2
(45) Date of Patent: Sep. 30, 2025

(54) SYSTEM, METHOD AND APPARATUS FOR A MONITORING DRONE

(71) Applicant: Omni Consumer Products, LLC, Addison, TX (US)

(72) Inventor: Stephen Howard, Dallas, TX (US)

(73) Assignee: OMNI CONSUMER PRODUCTS, LLC, Addison, TX (US)

( * ) Notice: Subject to any disclaimer, the term of this patent is extended or adjusted under 35 U.S.C. 154(b) by 181 days.

(21) Appl. No.: 16/636,836

(22) PCT Filed: Aug. 7, 2018

(86) PCT No.: PCT/US2018/045664
§ 371 (c)(1),
(2) Date: Feb. 5, 2020

(87) PCT Pub. No.: WO2019/032616
PCT Pub. Date: Feb. 14, 2019

(65) Prior Publication Data
US 2020/0371528 A1 Nov. 26, 2020

Related U.S. Application Data

(60) Provisional application No. 62/542,252, filed on Aug. 7, 2017.

(51) Int. Cl.
*G05D 1/00* (2024.01)
*G06Q 10/087* (2023.01)

(52) U.S. Cl.
CPC ......... *G05D 1/0251* (2013.01); *G05D 1/0022* (2013.01); *G05D 1/0094* (2013.01); *G06Q 10/087* (2013.01)

(58) Field of Classification Search
CPC .. G05D 1/0251; G05D 1/0022; G05D 1/0094; G05D 2201/0207; G06Q 10/087
See application file for complete search history.

(56) References Cited

U.S. PATENT DOCUMENTS

| | | | |
|---|---|---|---|
| 9,407,904 B2 * | 8/2016 | Sandrew | H04N 13/271 |
| 2002/0143672 A1 | 10/2002 | Sawasaki | |
| 2003/0036985 A1 | 2/2003 | Soderholm | |
| 2005/0168345 A1 | 8/2005 | Swafford et al. | |
| 2010/0076631 A1 * | 3/2010 | Mian | B25J 5/007 |
| | | | 701/19 |
| 2011/0282768 A1 | 11/2011 | Swafford et al. | |

(Continued)

FOREIGN PATENT DOCUMENTS

| | | |
|---|---|---|
| CN | 106850787 A | 6/2017 |
| JP | 2001-088912 A | 4/2001 |

(Continued)

OTHER PUBLICATIONS

International Search Report and Written Opinion for PCT/US2019/020377 dated May 17, 2019.

*Primary Examiner* — Ig T An

(57) ABSTRACT

A monitoring drone method, apparatus and system. The monitoring drone includes an image capture device for taking one or more images, a charge module for powering the monitoring drone, and a move module for allowing the monitoring drone to move about a shelf wherein the image capturing device captures images as the monitoring drone moves about the shelf to produce a virtual stereoscopic vision.

15 Claims, 3 Drawing Sheets

(56) References Cited

U.S. PATENT DOCUMENTS

| | | |
|---|---|---|
| 2013/0054411 A1 | 2/2013 | Unger |
| 2013/0117053 A2 | 5/2013 | Campbell |
| 2013/0223673 A1 | 8/2013 | Davis et al. |
| 2014/0344118 A1 | 11/2014 | Parpia et al. |
| 2014/0361077 A1* | 12/2014 | Davidson ............ G06Q 10/087 235/385 |
| 2015/0123973 A1* | 5/2015 | Larsen .................. G06T 15/04 345/427 |
| 2015/0262116 A1 | 9/2015 | Katircioglu et al. |
| 2015/0348327 A1 | 12/2015 | Zalewski |
| 2016/0114488 A1 | 4/2016 | Mascorro Medina et al. |
| 2016/0132059 A1* | 5/2016 | Mason ................ B65G 1/1373 701/28 |
| 2016/0134930 A1 | 5/2016 | Swafford |
| 2016/0182887 A1 | 6/2016 | Gutierrez |
| 2016/0286135 A1* | 9/2016 | Baseuny ............. H04B 1/3888 |
| 2016/0286175 A1 | 9/2016 | Dvorak et al. |
| 2016/0297545 A1 | 10/2016 | Yang et al. |
| 2017/0193430 A1 | 7/2017 | Barreira Avegliano et al. |
| 2017/0193434 A1* | 7/2017 | Shah .................... G05D 1/0212 |
| 2017/0286901 A1 | 10/2017 | Skaff et al. |

FOREIGN PATENT DOCUMENTS

| | | |
|---|---|---|
| JP | 2002-163436 A | 6/2002 |
| JP | 2010-277547 A | 12/2010 |
| JP | 2014-170431 A | 9/2014 |
| JP | 2015-032230 A | 2/2015 |
| JP | 2015-191254 A | 11/2015 |
| JP | 2016-012752 A | 1/2016 |
| KR | 10-2017-0067373 A | 6/2017 |
| KR | 20170067373 A | 6/2017 |
| WO | WO-2017/023841 A1 | 2/2017 |

* cited by examiner

SYSTEM, METHOD AND APPARATUS FOR A MONITORING DRONE

RELATED APPLICATION

This application is a national phase application of PCT/US2018/045664, filed Aug. 7, 2018, which claims priority to U.S. Application No. 62/542,252 filed Aug. 7, 2017.

FIELD OF THE INVENTION

The disclosure relates to systems, apparatus and methods for creating and operating a monitoring drone. More specifically, this disclosure relates to monitoring drone that is capable of monitoring activity relating to a shelf, cooler, store stand and the likes.

BACKGROUND OF THE INVENTION

It is common for merchandisers, retailers, store owners and the like to need details in relation to goods, inventory and consumer habits. For example, it has become useful to learn trends relating to product display, inventory replenishing, employee activity, consumer activity, etc. In many cases, the trends are needed in real time. However, it is costly to hire individuals to collect such information. Some devices were developed to help collect such information.

Unfortunately, such devices tend to obstruct passage, look unattractive, produce inaccurate data, and present many other issues. Therefore, there is a need for an improved system, apparatus and method for retrieving such details.

SUMMARY OF THE INVENTION

Embodiments described herein relate to a monitoring drone method, apparatus and system, monitoring drone includes an image capture device for taking one or more images, a charge module for powering the monitoring drone, and a move module for allowing the monitoring drone to move about a shelf wherein the image capturing device captures images as the monitoring drone moves about the shelf to produce a virtual stereoscopic vision.

BRIEF DESCRIPTION OF DRAWINGS

Reference will now be made to the following drawings.

DETAILED DESCRIPTION

Figure 1:
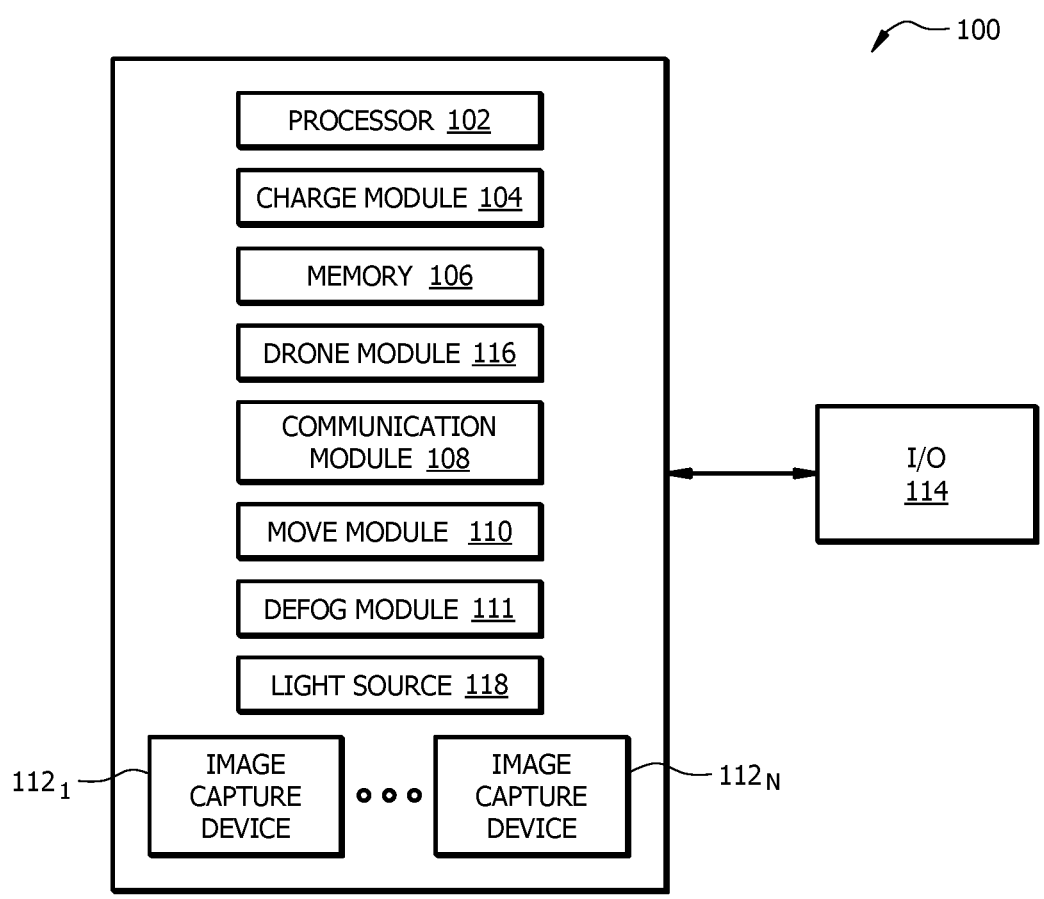
FIG. 1 is a block diagram illustrating an embodiment of an apparatus for a monitoring drone.

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware or combining software and hardware implementation that may all generally be referred to herein as a "circuit," "module," "component," or "system" (including firmware, resident software, micro-code, etc.). Further, aspects of the present disclosure may take the form of a computer program product embodied in one or more computer readable media having computer readable program code embodied thereon.

Aspects of the present disclosure are described herein with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions, hardware or a combination thereof. It is also understood that not all the elements listed are required and that the order specified is only by way of example.

FIG. 1 is a block diagram illustrating an embodiment of an apparatus for a monitoring drone 100. The monitoring drone 100 is used to monitor products, goods, shoppers, employees, etc. in a facility, such as, a retail store, distribution centers, or any place where goods are available. The monitoring drone may couple to a shelf, cooler, stand, or any structure capable of holding goods, products, articles, and the like. The monitoring drone 100 includes a processor (CPU) 102, a charge module 104, memory 106, communication module 108, move module 110, a defog module 111, one or more image capture device 112 (for multiple image capture devices 1121 . . . 112N), input/output devices (I/O) 114 and a drone module 116. In some embodiments, the monitoring drone 100 also includes a light source 118, such as a flash, Light-Emitting-Diode (LED), and the like.

Memory 106 may be any combination of one or more computer readable media. The computer readable media may be a computer readable signal medium, any type of memory or a computer readable non-transitory storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain or store a program for use by or in connection with an instruction execution system, apparatus, or device.

Computer program code for carrying out operations utilizing a processor or CPU 102 for aspects of the present disclosure may be written in any combination of one or more programming languages, markup languages, style sheets and JavaScript libraries, including but not limited to Windows Presentation Foundation (WPF), HTML/CSS, Node, XAML, and JQuery, C, Basic, *Ada, Python, C++, C#, Pascal, *Arduino, JAVA and the likes. Additionally, operations can be carried out using any variety of compiler available.

The computer program instructions on memory 106 may be provided to a processor 102, where the processor 102 is of a general purpose computer, special purpose computer, microchip or any other programmable data processing apparatus to produce a machine, such that the instructions, which execute via the processor of the computer or other programmable instruction execution apparatus, create a mechanism for implementing the functions/acts specified in the flowchart and/or block diagram block or blocks. The computer instructions may do one or more of the following, run the monitoring drone 100, give status or health of the monitoring drone 100 or the entire system utilizing the monitoring drone 100. In one embodiment, it may even perform image analysis and/or perform data compression.

These computer program instructions may also be stored in memory 106 (computer readable medium) that when executed can direct a computer, processor, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, processor, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/ acts specified in the flowchart and/or block diagram block or blocks.

The charge module 104 is utilized to power/maintain power to the monitoring drone 100. The charge module 104 may be a low power and might be wired or wireless and may utilize one or combination of the following battery, WIFI charging, coil, solar cells, or any other mechanism that provides charge to the monitoring drone 100.

The communication module 108 facilitates communication between the monitoring drone 100 and other devices, computers, networks, cloud, I/O devices 114, and the likes. The communication module 108 may include ethernet, USB connection, port connections of various types, wireless, combination thereof and the likes. The communication module 108 may communicate in real-time, in intervals, on demand or a combination there of.

The move module 110 facilitates movement about a shelf, cooler, stand, store ceiling, floor and the likes and may utilize any mechanical or electrical mechanism to do so. Some embodiment are further described in FIG. 2 and FIG. 3. The move module 110, for example, may utilize wheels, motors, pneumatics, magnetics, levitation, etc. The move module 110 may also provide a coupling mechanism for the monitoring drone 100 to the shelf, cooler stand and the likes. In one embodiment, the move module 110 moves the monitoring drone 100 in a predetermined path or in a path set by the hardware configuration.

In one embodiment, the monitoring drone 100 may utilize a defog module 111 to prevent or clear condensation, for example, if placed outdoors, in a cooler, and the like. The defog module 111 may include electrical mechanism, mechanical mechanism, fluids, combination thereof and the like. The drone module 111 may also utilize computer instructions in memory 106 and processed by processor 102.

The monitoring drone 100 may utilize the image capture device 112 or multiple image capture device 1121 . . . 112N. The image capture device 112 may be one or more of the following a mono-camera, a stereo camera, a video camera, an infrared camera, a Realsense camera, Kinect Camera, Leap camera, a depth camera, a color camera, structured light camera, a combination thereof, and the likes. In one embodiment, multiple image capture device 1121 . . . 112N are used in a configuration where the image capture device 1121 . . . 112N may be angled in one or more angle to capture different views. In another embodiment, the multiple image capture devices 112 communicate to learn location in relation to one another. For example, the image capture device 112 may communicate with image capture device 112 on both sides of the shelf or isle. As such, such communication is utilized for mapping of a facility or room mapping using depth, such as, a store, distribution center, etc. As such, the monitoring drone 100 may be utilized for determining where objects, such as, goods, inventory, individuals, are located within the such a facility. Hence, such a configuration mat be used for third parties to determine arrival of items to a facility and to confirm placement. For example, a chips stand-alone cardboard can be remotely verified to confirm arrival, installation and/or location within a store, etc.

In one embodiment, the monitoring drone 100 may also include a GPS, Beacon Technology or any technology that allows for learning location, including WIFI, Beaker technology, Bluetooth mesh, infrared, etc. In such an embodiment, the monitoring drone 100 may facilitate way finding, for example, to locate a product in a store etc. The monitoring drone 100 may also include a display, laser pointer, or any communication facilitator.

The input/output module (I/O) 114 may be any devices that are used to present, print, receive, store, analyze, transmit, communicate, etc. with the monitoring drone 100. The I/O 114 may be coupled wirelessly or with a wire with the monitoring drone 100. The I/O 112 may be used to display, analyze, print, sound, etc., images or information relating to the monitoring drone 100, its surroundings, etc. The I/O 114 may also transmit information to the monitoring drone 100; for example, for updates, resets, data retrieval or data inputting, learn vitals, trouble shoot, control various components of the monitoring drone 100, etc.

In one embodiment, the monitoring drone is capable of speech recognition and/or display. For example, a shopper may ask the monitoring drone 100 the location of an item. The monitoring drone 100 may display a location on, for example, an LED display or the likes. In an embodiment where the monitoring drone 100 can communicate with other monitoring drones 100, it may inform the monitoring drone 100 at the location of the question, Using face recognition, the monitoring drone 100 closer to the location of the item may use a pointer, such as, an infrared or laser pointer to highlight a specific path or location to the shopper. Even when face recognition is not used, the monitoring drone 100 close to the location can still highlight a location using such technology.

Figure 2:
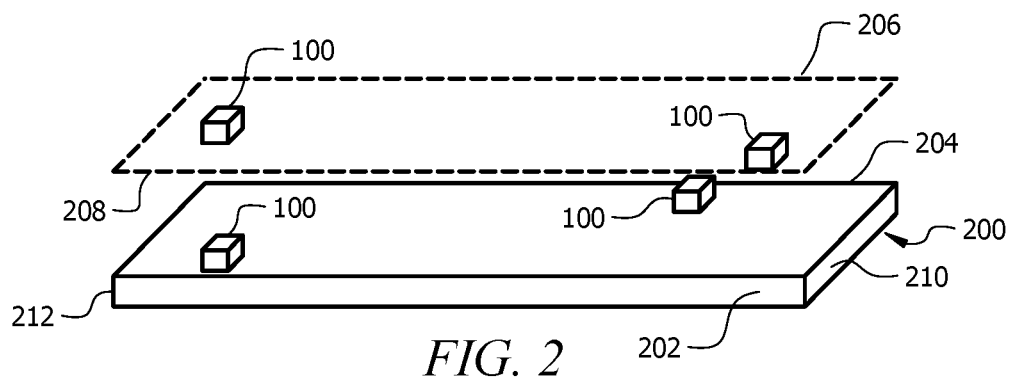
FIG. 2 is a diagram illustrating an embodiment of a monitoring drone configuration for a shelf.

FIG. 2 is an embodiment illustrating a monitoring drone 100 configuration for a shelf 200. The monitoring drone 100 may be placed anywhere around or on the shelf, i.e. around the proximity close to the front bottom 202, back bottom 204, back top 206, front top 208, and/or the sides 210 of the shelf 200. Multiple monitoring drones 100 may be placed about the shelf 200. In one embodiment, the monitoring drone 100 is placed on a rail 212 on the price channel of the shelf 200. The rail 212 may be a straight line, C-shape, or any shape needed. The rail 212 may allow the monitoring drone 100 to move about the shelf utilizing gear/tooth, magnetic lock, magnetic levitation, etc. In one embodiment, the monitoring drone 100 moves about the shelf 200 without a rail. Any number of drones may be placed around or on the shelf.

In one embodiment, the monitoring drone 100 is coupled to a shelf to create an "intelligent shelf" without the need for electricity. For example, the monitoring drone includes a single image capture device and a low power source, such a battery, being charged by coils or any other wireless charge mechanism. The monitoring drone 100 moves up and down the edge of the shelf or the price channel portion if the shelf. The monitoring drone 100 may be placed within a clear tube to prevent theft or avoid inflicting any harm on those close by it as it moves. The image capture device takes images as it moves, for example, of the shelf it sits on, a shelf in front of it, a series of shelves around it, or the surrounding of the shelf(s).

The images captures by the monitoring device 100 may be stitched to form a virtual stereoscopic imagery or vision of the shelf(s) and/or its surroundings. In one embodiment, the images are captures in time or distance intervals to facilitate the stitching of the images into a virtual stereoscopic vision (image). In another embodiment, the images are analyzed and stitched based on common pixels. For example, a mono-camera may be used to produce a virtual stereoscopic image, to create average, to determine depths, etc.

In one embodiment, a virtual mask may be developed to remove differences between images and to better identify objects being monitored in contrast with objects passing by or introduced for a short term, such as a cart.

In one embodiment, the monitoring drone 100 may be place at a higher elevation, such as, the upper portion of a shelf assembly, or may be place at the bottom portion of a shelf assembly. A shelf assembly is two or more shelves 200. In yet another embodiment, the image capture device may be angled up or down to facilitate visibility or to capture a specific view. In one embodiment, the monitoring drone 100 monitors the shelf 200 or shelf assembly that it is coupled to. In another embodiment, the monitoring drone 100 monitors a shelf or shelf assembly that is across from its location. As such, the monitoring drone 100 moves across the rail and captures images of a section of a shelf, an entire shelf, a shelf across the isle or a shelf assembly across the isle. All capabilities and setup discussed herein for a shelf is also applicable for a cooler, stand, retail display, distribution facilities, etc.

Figure 3:
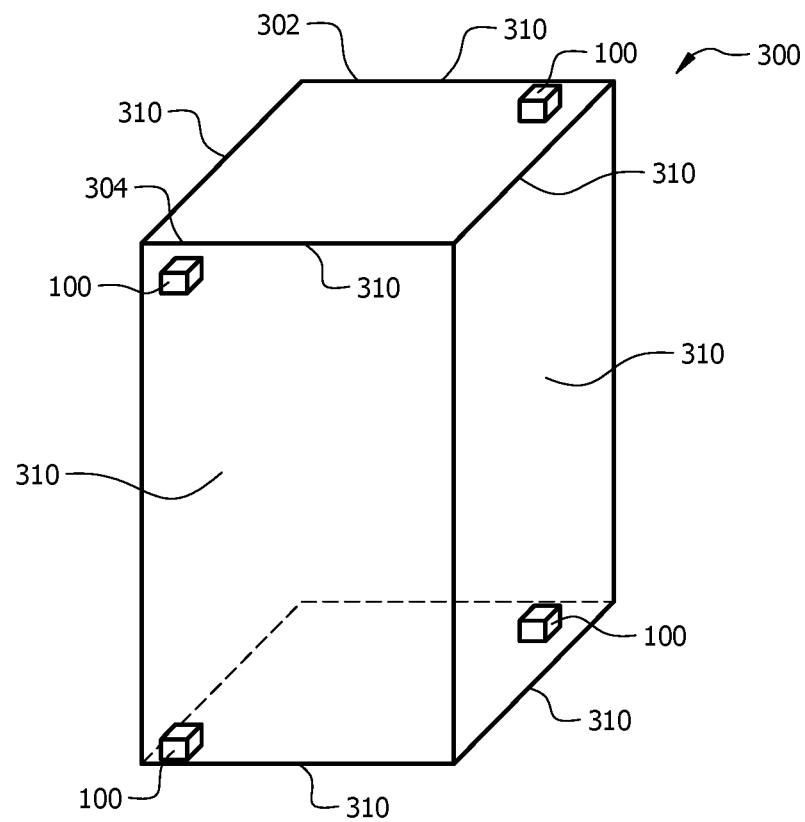
FIG. 3 is a diagram illustrating an embodiment of a monitoring drone configuration for a cooler.

FIG. 3 is an embodiment illustrating a monitoring drone 100 configuration for a cooler 300. The monitoring drone 100 may be coupled to the cooler 200 at the top back 302, top front 304, bottom back 306, bottom front 308, or any sides 310 of the cooler 300.

Figure 4:
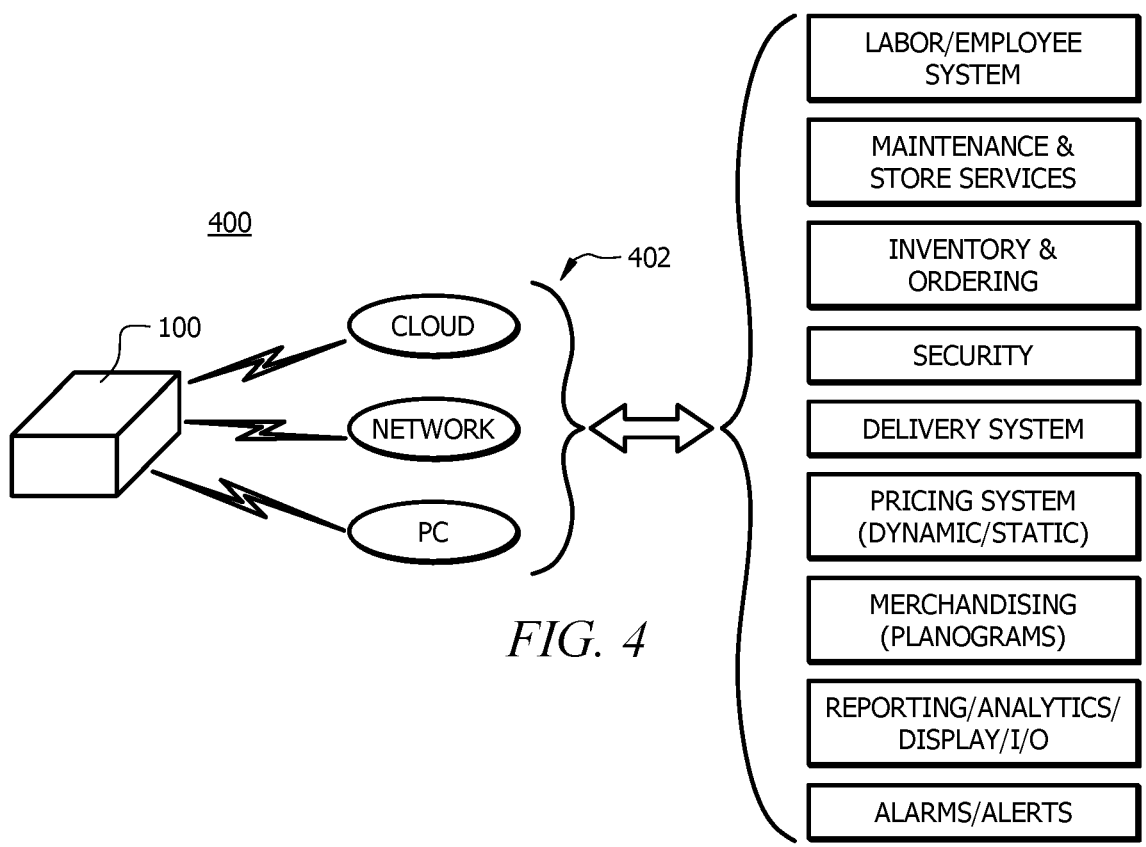
FIG. 4 is a diagram illustrating an embodiment of a monitoring drone system.

FIG. 4 is a diagram illustrating an embodiment of a monitoring drone system 400. The monitoring drone system 400 includes a monitoring drone 100, as described above in FIG. 1, and data system 402. The data system 402 may include one or more of the following cloud, network, personal computer, main frame, portable devices, and the like. In FIG. 4, and by way of example, a cloud, network and a personal computer are illustrated. The data system 402 may be couple to the monitoring drone 100 wirelessly or with a wire. The data system 402 receives data and/or images from the monitoring drone 100. The data system 402 is capable of performing analysis on the images received to determine if an item in the image is to be monitored or if it is an item that is temporarily in the image and, thus, does not require monitoring.

The data system 402 is capable of performing analysis on an image and provide analytical data to one or more of the following system: labor/employee systems, maintenance/store services, inventory/ordering, security, delivery system, pricing system (in some cases for dynamic pricing), merchandizing, reporting/analytics tools, display and/or I/O devices and may generate alarms/alerts. In one embodiment, some of the data system 402 functionality may be performed by the monitoring drone 100.

For example, the monitoring drone 100 travels across the pricing channel of the shelf 200 utilizing a rail 212. The image capture device 112 of the drone 100 capture images of products or inventory on the shelf 200. The communication module 108 transmits the images to the data system 402. The data system 402 analyzes the difference between the images and, accordingly, determines one or more of the following: items consistently in the image (products on a shelf), items in the image for a short term (i.e. customer walking by), items in the image for a long term but not consistently (i.e. a cart left behind). Such determination may be concluded utilizing depth information, time duration, and/or combination thereof. In one embodiment, the communication module 108 facilitates communication with mobile devices, other image capture device(s), retailers, shoppers, inventory stockers, etc.

As such, if the data system 402 determines that an item is left behind, a message may be transmitted to an alert system or employees' mobile devices, etc. However, the data system 402 may determine the item is consistently in the image and identify it as a product. And thus, if the product depth changes over time, then inventory change is noted and other systems may be notified to account for the inventory change, request the shelf be replenished, determine consumer habits in purchasing, etc. In another embodiment, the data system 402 determined that an item is there for a short time because a shopper walked in the view of the image capture device. In such case, the data related to the shopper may be used for face recognition, merchandizing, planograms, or may be ignored. In yet another embodiment, the drone monitoring system may be utilized to determine employee efficiency, effectiveness in maintaining proper product shelving, etc.

The drone monitoring system 400 is capable of determining spacing between products and may use triangulation/depth to determine if items are placed or missing within a distance threshold (item further from threshold may mean empty spot on a shelf whereas item closer from distance threshold may mean object in isle, etc.). A distance threshold may be a set distance, a range, and/or learned over time by the monitoring system 400. Its analysis may be used to determine one or more of the following: recognize products, product description, product location, product location accuracy (planogram), product amount (number), product amount above or below a threshold, need for price change, price accuracy, security issues, facial recognition, buyers' habits, etc.

Figure 5:
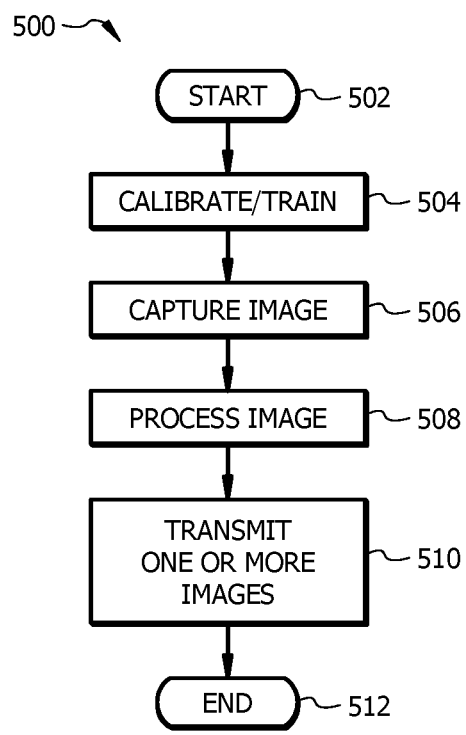
FIG. 5 is a flow diagram illustrating an embodiment of a drone monitoring method.

FIG. 5 is a flow diagram illustrating an embodiment of a drone monitoring method 500. The method starts at step 502 and proceeds to step 504. At step 504, the method 500 calibrates and/or trains the monitoring drone to be ready to perform one or more of its functions, such as, the monitoring drone may calibrate its image capture device, determines the products it is monitoring, learns or receives data relating to the product type, its representation, its location on a shelf, its location in a store, metadata related to the product or store, time/date setting, movement calibration, communication handshaking, etc.

Next, at step 506, the method 500 captures images as it moves around and then processes the image at step 508. In one embodiment, the processing of the image may be archiving the image to memory and/or preparing the image to be transmitted. In another embodiment, at step 506, the method 500 may determine the validity, quality and/or categorize an image. In yet another embodiment, the image may be analyzed to provide monitoring data based on image content analysis. At step 510, the method 500 transmits images and/or data and the method ends at step 512.

Even though all these items are shown to be in the same system 400, yet, they may be distributed in multiple systems that may or may not be in the same location. In one embodiment, images and/or data is communicated to a cloud system.

It will be appreciated by those skilled in the art that changes could be made to the embodiments described above without departing from the broad inventive concept. It is understood, therefore, that this disclosure is not limited to the particular embodiments herein, but it is intended to cover modifications within the spirit and scope of the present disclosure as defined by the appended claims.

What is claimed is:

1. A monitoring drone configured to couple to a shelf, comprising:
   a processor;
   a memory;
   an image capture device for taking one or more images, wherein the image capture device is coupled to at least one of the processor and the memory;
   a charge module for powering the monitoring drone; and
   a move module for allowing the monitoring drone to move about the shelf along a rail member that is provided on a pricing channel coupled to the shelf, wherein the image capturing device captures a plurality of images of a shelf other than the shelf it is coupled to as the monitoring drone moves along the rail member about the shelf it is coupled to, the plurality of images stitched together to generate a virtual stereoscopic image, wherein the image capture device repeatedly captures the respective plurality of images from the same distance from the shelf other than the shelf it is coupled to.

2. The monitoring drone of claim 1, wherein the image capturing device 1s a mono-camera.

3. The monitoring drone of claim 1, wherein the image capturing device is at least one of a stereo camera, a video camera, an infrared camera, a Real Sense™ camera, a depth camera, a color camera, and structured light camera.

4. The monitoring drone of claim 1, wherein the charge module is a low power charge module.

5. The monitoring drone of claim 4, wherein the monitoring drone is coupled to a shelf without electricity.

6. The monitoring drone of claim 1, wherein the move module comprises at least one of wheels, motors, pneumatics, magnetics, and levitation.

7. The monitoring drone of claim 1 further comprising at least one of a communication module, a GPS, a display, face recognition technology, a pointer, Beacon Technology and a defog module.

8. The monitoring drone of claim 1, wherein the drone comprises multiple image capture devices capable of capturing images of different directions.

9. The monitoring drone of claim 1, wherein the image capture device at least one of zooms, pivots and rotates.

10. A monitoring drone system, comprising:
    one or more monitoring drone communicating with at least one of a network, computer, mobile device and memory, each monitoring drone comprises an image capture device for taking one or more images, wherein the image capture device is coupled and a move module for allowing the monitoring drone to move about a shelf along a rail member that is provided on a pricing channel of the shelf, wherein the monitoring drone is coupled to the shelf and wherein the image capturing device captures a plurality of images of a shelf other than the shelf that it is coupled to as the monitoring drone moves along the rail member about the shelf it is coupled to, the plurality of images stitched together to generate a virtual stereoscopic image and communicates the plurality of images, wherein the image capture device is repeatedly captures the respective plurality of images from the same distance from the shelf other than the shelf it is coupled to.

11. The monitoring drone system of claim 10, wherein the monitoring drone system determines the location of the monitoring drones in relation to one another and produces a mapping of the location from the captured image.

12. The monitoring drone system of claim 10, wherein the monitoring drone moves in a straight line, C-shape, circularly, zikzak, vertically, or horizontally.

13. A monitoring drone method, comprising:
    moving about a shelf, along a rail member that is coupled to the shelf, in a predetermined path; and
    capturing a plurality of images of a shelf other than the shelf that it is coupled to as the monitoring drone moves along a rail member that is provided on a pricing channel of coupled to the shelf, wherein the captured plurality of images are utilized to produce generate a virtual stereoscopic image utilized for determining at least one of at least one object in the captured imaged related to the shelf or the surroundings, wherein the image capture device is capable of repeatedly capturing the respective plurality of images from the same distance from the shelf other than the shelf it is coupled to.

14. The monitoring drone method of claim 13 further comprising communicating with at least one other monitor drone to determine location.

15. The monitoring drone method of claim 13, wherein the step of moving is in at least one of a straight line, C-shape, circularly, zikzak, vertically, and horizontally.

* * * * *